No. 611,713. Patented Oct. 4, 1898.
J. F. SKERSICK.
SAW SET AND JOINTER.
(Application filed May 9, 1898.)
(No Model.)
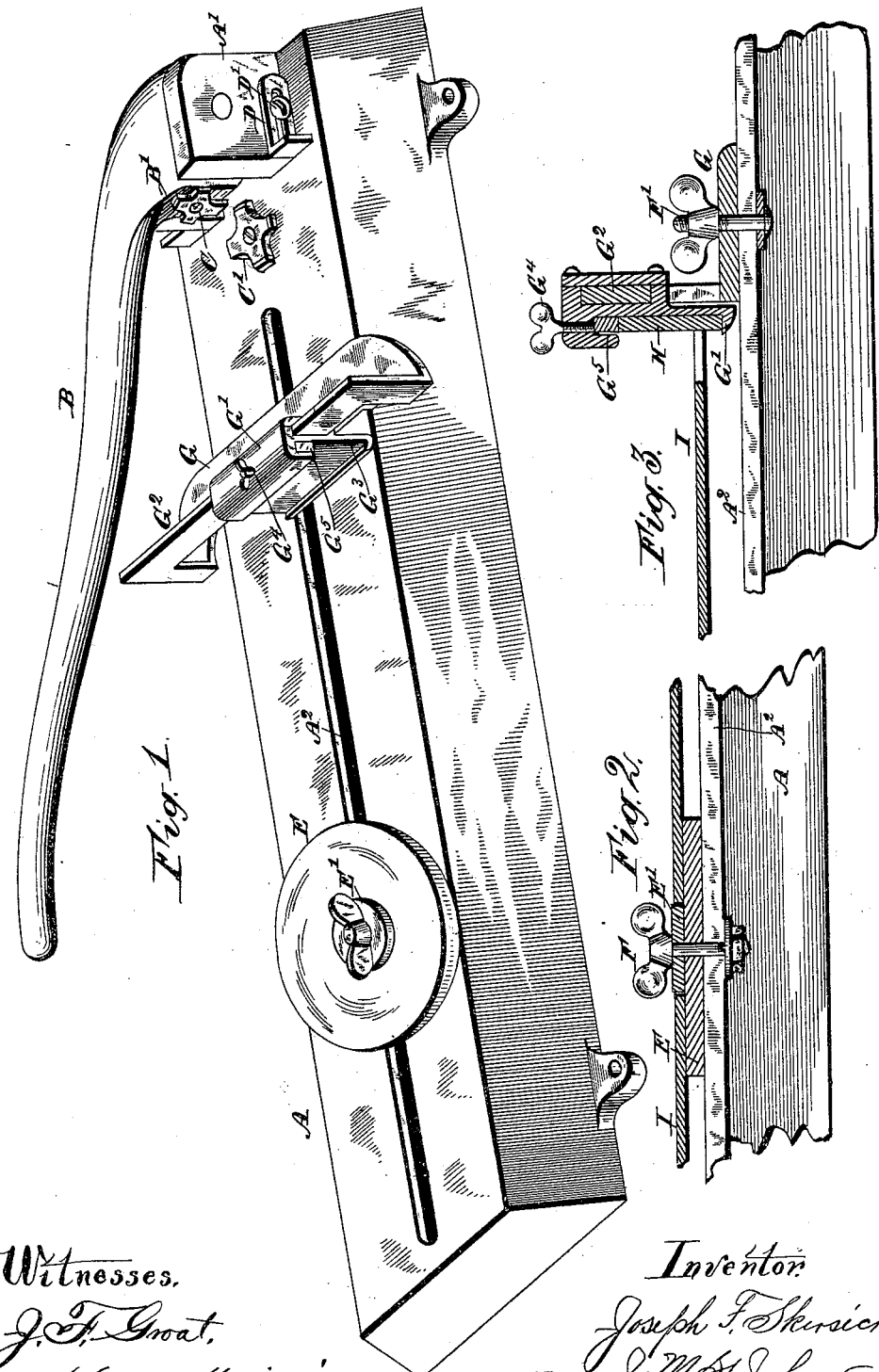

UNITED STATES PATENT OFFICE.

JOSEPH F. SKERSICK, OF CEDAR RAPIDS, IOWA.

SAW SET AND JOINTER.

SPECIFICATION forming part of Letters Patent No. 611,713, dated October 4, 1898.

Application filed May 9, 1898. Serial No. 680,121. (No model.)

*To all whom it may concern:*

Be it known that I, JOSEPH F. SKERSICK, a citizen of the United States, residing at Cedar Rapids, in the county of Linn and State of Iowa, have invented certain new and useful Improvements in Saw Sets and Jointers; and I do hereby declare the following to be a full, clear, and exact description of the invention, such as will enable others skilled in the art to which it appertains to make and use the same.

This invention is designed to facilitate the jointing and setting of saws, both straight and circular, and is embodied in a device hereinafter fully described and claimed, reference being had to the accompanying drawings, in which—

Figure 1 is a view in perspective of my improved saw set and jointer in position for use as a jointer. Fig. 2 is a central longitudinal section, in a vertical plane, of the support for a circular saw. Fig. 3 is a similar section of the jointer and connected parts.

Similar letters of reference indicate corresponding parts.

In the drawings, A designates a base adapted to be attached to a bench or other suitable support. At one end it is provided with upwardly-projecting lugs A', between which is pivoted a hand-lever B. On a shoulder B' of this lever is attached an adjustable saw-set die C, which operates in conjunction with another one of like character, C', attached to the base below it. These dies have differently-sized projections to adapt them for use on saws of different-sized teeth and do not differ essentially from a well-known set in common use.

To the lugs A' at each side are attached angle-plates D, which serve as guides for a straight saw-blade, the teeth of which in the setting of a saw are placed against the plane faces of the guides. The angle-plates are slotted for adjustment to saw-teeth of different sizes and held in place by suitable screws D'.

The base is provided with a central slot $A^2$ to receive bolts for the attachment of a center support for circular saws and the jointing devices. The center support consists in a disk E to raise the saw high enough above the top of the base to allow the teeth to rest properly on the set C' and also to bring the teeth on the right level to engage a file held in the jointer. To the center of this disk is attached a smaller disk E' by a suitable thumb-bolt F, passing through the slot in the base and held in position by a suitable nut and washer. Disks E' of different sizes are provided corresponding to the size of the hole in the saw.

In setting the saw the jointing device is removed and the teeth are successively brought in contact with the set by turning on the center, as will be readily seen.

The jointer consists of a guide-plate G, adjustably attached to the base A by a thumb-bolt F', and a slide G', movable on the guide-bar $G^2$. In one side of the slide is a recess $G^3$ to receive a mill-file H, which is held in position by a thumb-screw $G^4$ in connection with a gib $G^5$. The saw I, being mounted on its center support, may thus be brought into contact with the jointing-file and the points of the teeth be accurately dressed preparatory to sharpening.

Having thus described my invention, what I claim as new, and desire to secure by Letters Patent, is—

In a saw set and jointer, the combination of a base having fulcrum-lugs at one end, a set-lever pivoted therein, saw-setting dies mounted on said base and lever, respectively, adjustable guides attached to said lugs, an adjustable support for a circular saw, and a jointer composed of a guide having a base-plate adapted to slide lengthwise of the main base, a clamp and thumb-screw to fasten the same, a guide-bar at right angles thereto, and a slide thereon, said slide having a seat at one side to receive a file, and a thumb-screw and gib to hold the same, substantially as described.

In testimony whereof I affix my signature in presence of two witnesses.

JOSEPH F. SKERSICK.

Witnesses:
 JOSEPH W. SKERISICK,
 J. F. GROAT.